Aug. 17, 1926.  
W. L. GOODMAN  
CHECK CARD AND HOLDER  
Filed March 30, 1925  
1,596,424
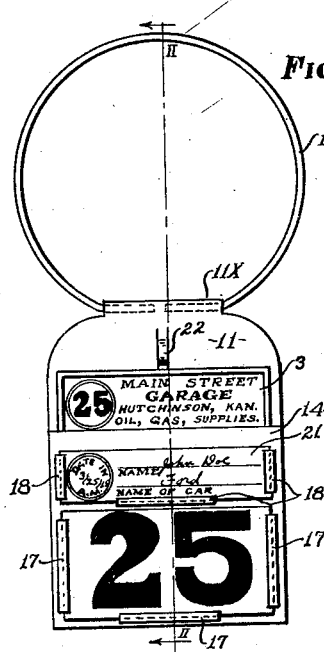
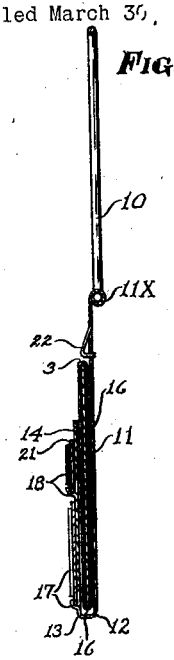
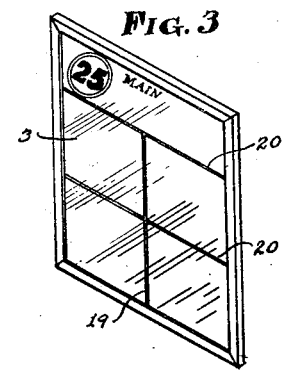
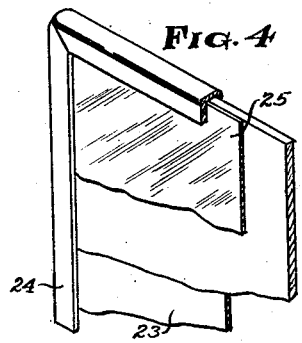
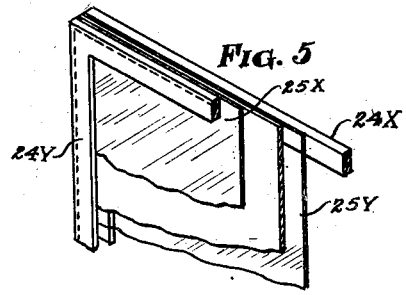
INVENTOR.  
William L. Goodman  
BY  
William C. Edwards Jr  
ATTORNEY.

Patented Aug. 17, 1926.

1,596,424

UNITED STATES PATENT OFFICE.

WILLIAM L. GOODMAN, OF HUTCHINSON KANSAS.

CHECK CARD AND HOLDER.

Application filed March 30, 1925. Serial No. 19,372.

The invention relates to a device and a card in combination therewith which is of use in garages and the like for the storage of automobiles etc., or for showing needed repairs, or for such other uses as devices of this character might be satisfactorily used.

In many States, the laws require that when an automobile is driven into a garage for storage, repair or the like, that a record be affixed to the automobile, such as may give due notice to legal authorities as to the ownership of the automobile; and also to give to the owner, driver or chauffeur of the automobile, a claim ticket or card such as will enable him to secure the automobile at such time as he prefers or it may be available. My invention relates to a check holder and card for this purpose and comprises in addition thereto an advertising device, wherein information of value may be imparted to the automobile owner or driver, and which information likewise may revert by some means as a reward or recompense to the garage owner. For instance, advertising space may be sold on the card, to defray the cost of the holder and check card; or in other ways or manner profit may be secured. To obtain these several advantages, I employ a holder having a handle adapted to attach to some part of an automobile; said holder having places, parts or receptacles to receive, or hold certain cards, numerals, advertising mediums and the like.

In the drawings; Fig. 1 shows a front view of the check card and holder. Fig. 2 represents a sectional view taken along the line II—II Fig. 1 looking in the direction of the arrows. Fig. 3 is a perspective view of the check card and advertising means or medium, as handed to the automobile owner. Fig. 4 is a fragmentary and detail view of a portion of the part seen in Fig. 3. Fig. 5 is a modification of Fig. 4 as to construction elements employed. Similar numerals of reference indicate corresponding parts throughout the several figures of the drawings.

Referring to the drawings. Attached to a ring 10 and depending therefrom is a sheet metal plate 11, connected by means of its top edge 11ˣ being bent over to engage the lower portion of the ring 10 as clearly shown. The plate 11 is bent at 12 and 13 to form the bottom of a compartment, the plate continuing upwardly from the bend 12 as a face portion 14, the side edges of the portions 14 and 11 are preferably attached together by clinching or otherwise unionized so as to complete the pocket or compartment 16 into which the check card seen in Fig. 3 is normally positioned. The rear element 11 and the face element 14 are in parallelism forming a U-shaped compartment or pocket 16; the face portion 14, however does not extend as high as the upper edge portion 11ˣ of the rear element 11.

The check card 3 carries a number such as "25" or any other number or letter to conform to that retained on the part 14 of the holder. In Fig. 1 at the lower part of the figure is shown a card with the numeral 25 in large figures thereon; as shown this is a card held to the face portion 14 by means of flanged side and bottom members, being tangs cut partly away from the member 14 and bent as indicated to hold the identifying card numeral. If desired instead of forming the tangs 17 and using a card showing the number, the face of the holder 14 might be pressed or embossed with a desired number, to the end that however done, an identifying number remains on the holder to correspond with the similar identifying number on the check card, Fig. 3. The check card Fig. 3 in addition to the numeral "25" may have in an upper space such information as is illustrated in conjunction therewith, in Fig. 1. Below this upper portion the card is divided by a vertical line 19 and horizontal lines 20, 20 into spaces upon which advertising matter may be printed for firms or individuals and whereby revenue will be secured for the garage operator as owner of the check holder.

To show how the holder is employed; assume an automobile owner drives into the garage, the driver gives his name as John Doe, for instance, the car is a Ford. The garageman writes this information together with the date the automobile is received, upon a card 21 Fig. 1 and sticks it into the face of the holder 14, retained by means of the tangs 18 similar to tangs 17. He hands the car owner the check card seen in Figs. 1 and 3, which must be surrendered to obtain the automobile. The ring 10 enables the holder to be attached to the radiator cap, or some other projecting part of the automobile. A spring member 22 is a tang cut and bent from the body 11 in the manner shown in Fig. 2; this serves to act as a spring stop to prevent easy removal of the check holder card Fig. 3 when placed within the pocket 16.

The preferred check card Fig. 3 includes a sheet metal backing 23 whose edges 24 are crimped over to retain the card carrying the printed matter, Figs. 1 and 3 and behind a transparent cover plate 25. Fig. 5 shows a modification. In that two transparent cover plates $25^x$, $25^y$ such as isinglass or transparent paper secure the central advertising card therebetween; the edge portions $24^x$ and $24^y$ may be leather or other material stitched together on opposite sides of the composite check card to hold the several parts together.

It is obvious that a device of this character is useful for the purpose intended and that the advertising features, identifying features in combination with the permanent character of the device itself lend a tone and appearance justifying the use thereof.

Such modifications may be employed as lie within the scope of the appended claim.

Having fully disclosed my invention what I now claim as new and desire to secure by Letters Patent is:

In a device of the class described, a U-shaped sheet metal compartment element having a face portion forward of a rear portion; the rear portion extending further upwardly than the face portion; a ring attached to the upper edge of the rear portion; a check card within the compartment with a portion of said check card extending upwardly beyond the face portion, a spring stop above the check card; a pair of cards arranged on the face portion, one above the other, and below the upper portion of the check card; and tangs on the face of the device for securing said arranged cards in their relative position with respect to each other.

In testimony whereof I affix my signature.

WILLIAM L. GOODMAN.